March 20, 1973 M. F. ORR 3,721,025
POWER DRIVEN SNOW BLOWER
Filed March 13, 1969 6 Sheets-Sheet 1
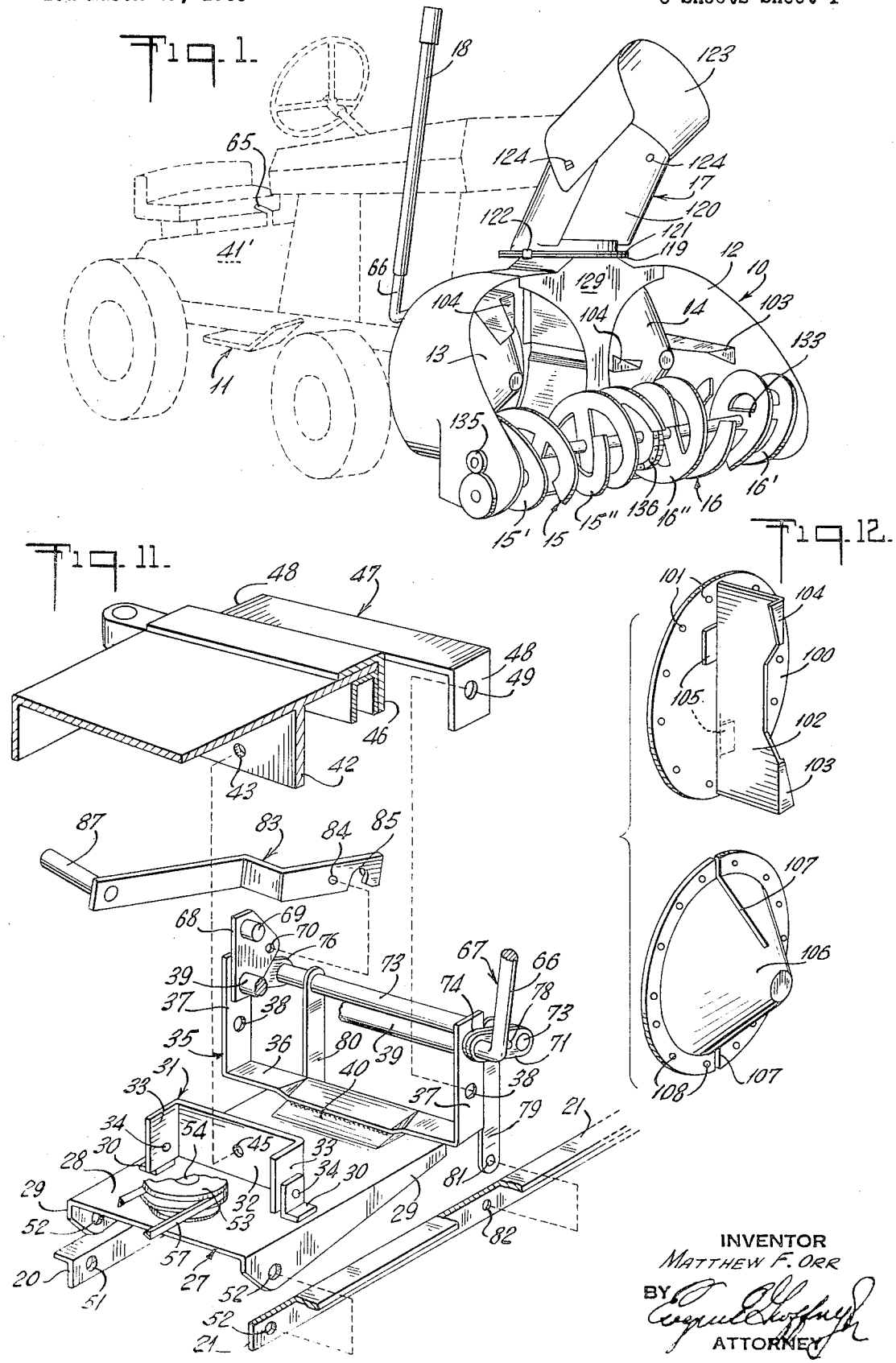
INVENTOR
MATTHEW F. ORR
BY
ATTORNEY

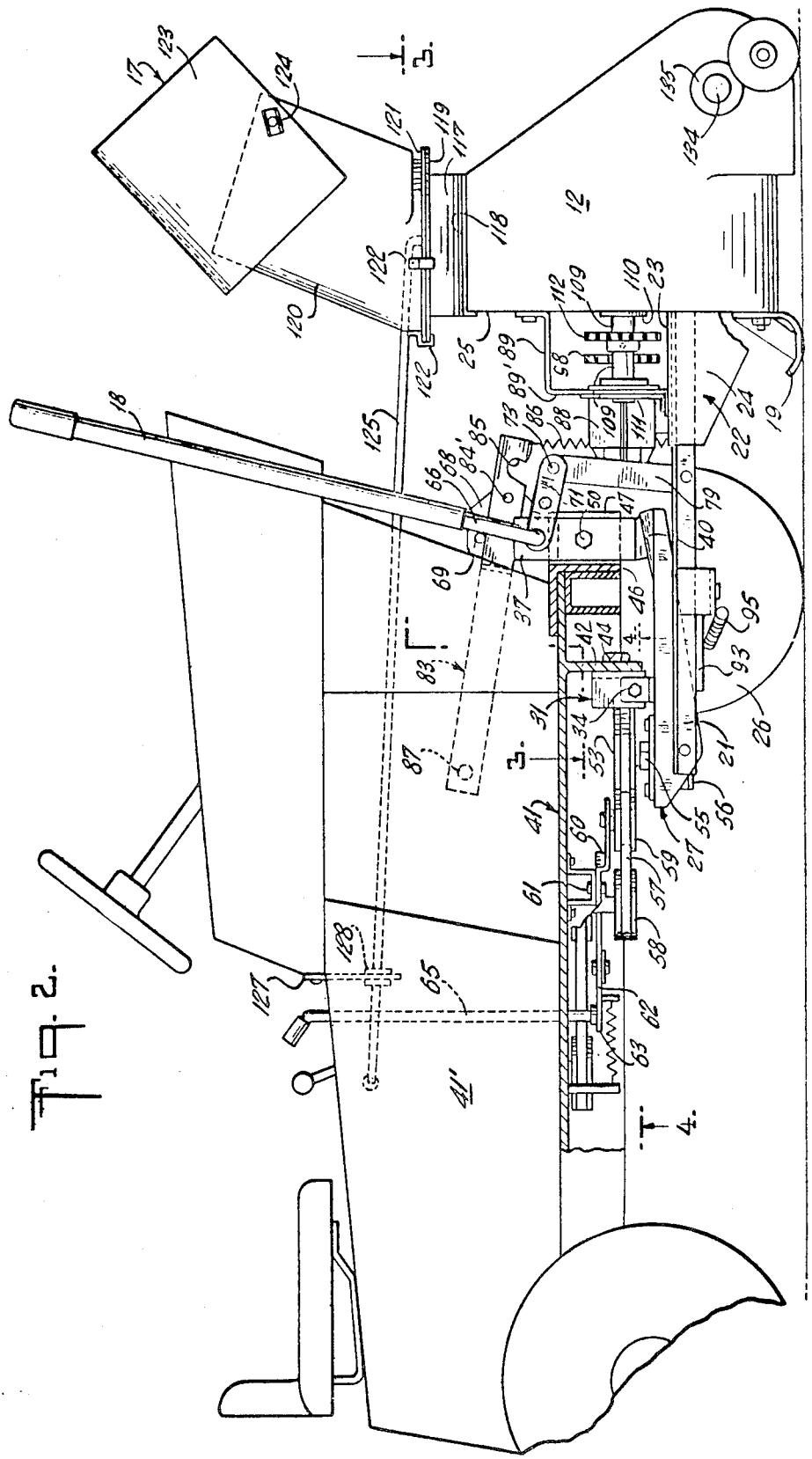

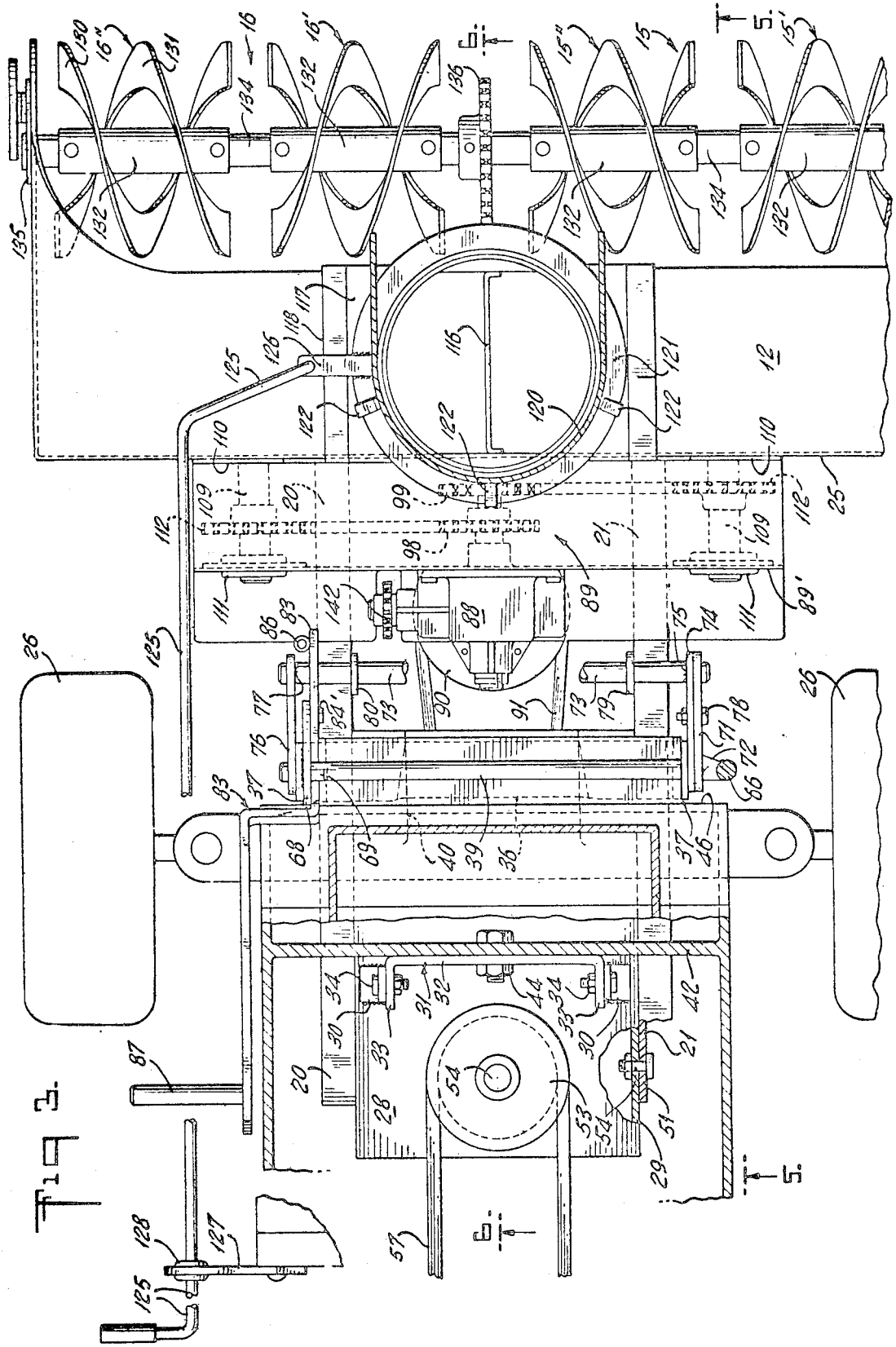

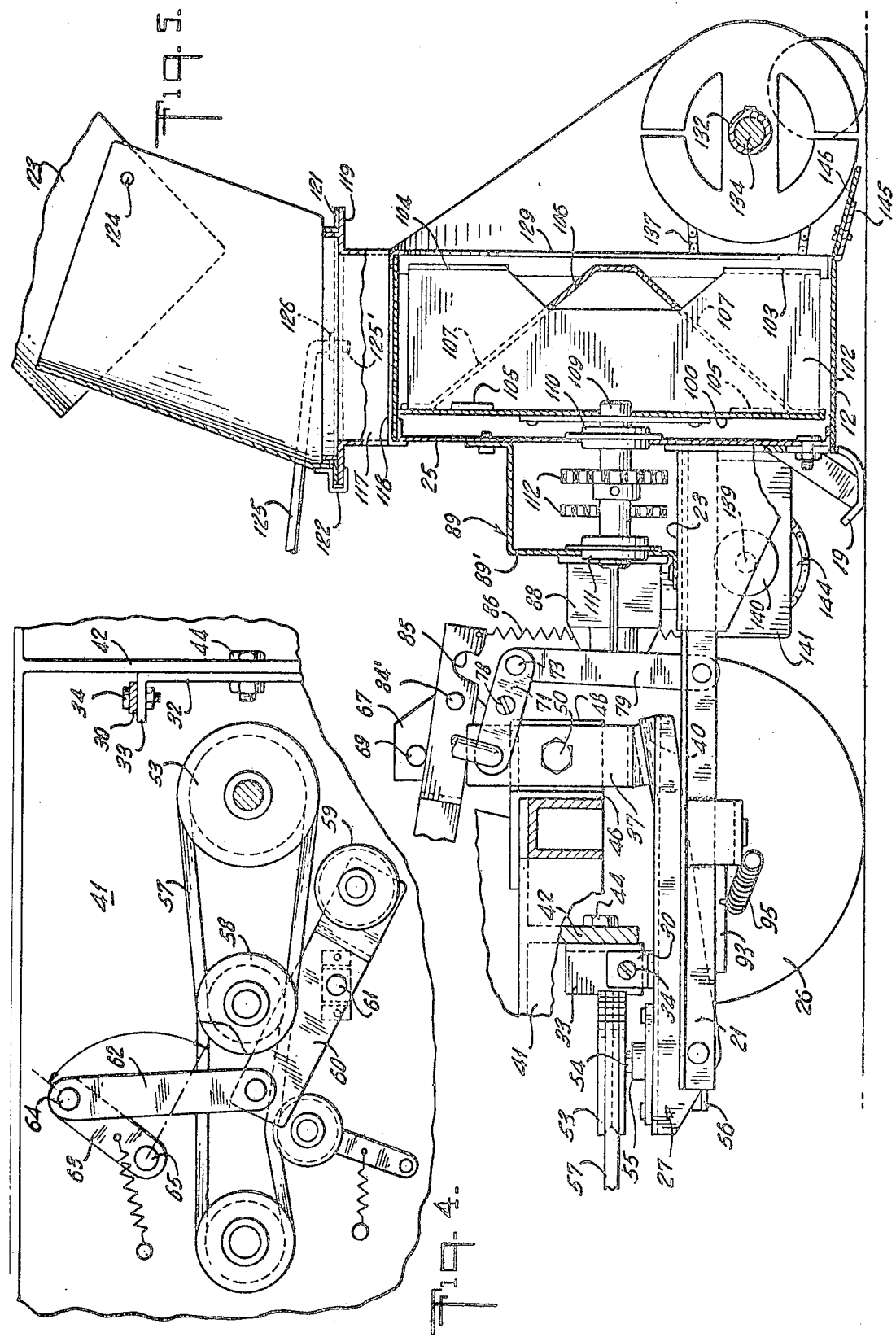

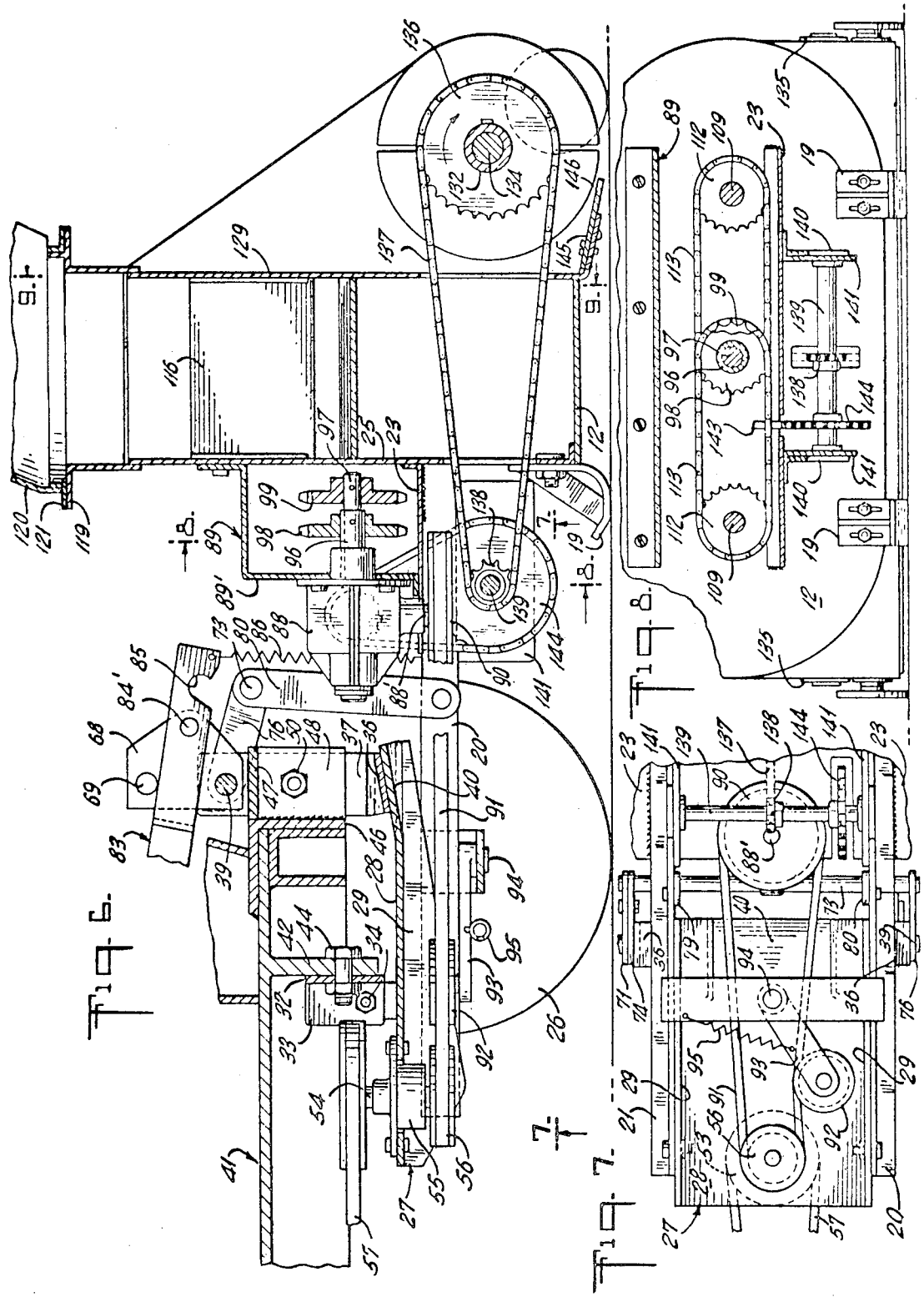

March 20, 1973   M. F. ORR   3,721,025

POWER DRIVEN SNOW BLOWER

Filed March 13, 1969   6 Sheets-Sheet 6

United States Patent Office 3,721,025
Patented Mar. 20, 1973

3,721,025
POWER DRIVEN SNOW BLOWER
Matthew F. Orr, Shawnee Mission, Kans., assignor to Poloron Products of Indiana, Inc., New Rochelle, N.Y.
Filed Mar. 13, 1969, Ser. No. 806,878
Int. Cl. E01h 5/00
U.S. Cl. 37—43 E
1 Claim

ABSTRACT OF THE DISCLOSURE

A snow blower for attachment to a tractor having counter rotating blowers and two sets of augers supported by a unitary housing. The snow blower is provided with rearwardly extending arms secured to a support assembly removably attached to the tractor. The support assembly includes means for transmitting power from the tractor engine to the snow blower as well as means for raising and lowering the blower relative to the tractor, locking the blower in the raised position and adjusting the height of the blower from the surface being cleared.

This invention relates to snow blowers and more specifically to a novel and improved snow blower using multiple augers and an improved arrangement for securing the blower to and driving it from a motor driven vehicle such as a garden tractor. By reason of a novel and improved arrangement and organization of elements the snow blower can be quickly and easily attached to a tractor and at the same time the elevation of the snow blower from the surface to be cleared can be readily adjusted. As a result, the snow blower in accordance with the invention is readily adaptable for use in clearing snow from all types of surfaces.

Prior known devices for clearing snow particularly from small areas such as driveways, sidewalks and areas surrounding small commercial buildings have not been found to be entirely satisfactory. In many cases the devices are useful only in instances involving exceedingly dry snow as they tend to clog and become inoperable with wet snow. Furthermore, chunks of ice frequently clog the blower, and it fails to function properly to gather the snow for discharge from the snow blower. Furthermore, in instances where gasoline engines are mounted integrally with the snow blower, the heat generated by the engine may be transmitted to portions of the blower and thereby increase the tendency of the blower to clog and thus fail to operate. Rocks and other solid materials which may be embedded in the snow also create difficulties since they may either become wedged in the augers or in the blower housing causing material damage if not effecting interruption of the snow removal operation.

This invention overcomes difficulties heretofore entailed with prior known devices and provides a novel and improved snow blower which is effective for the removal of both wet and dry snow and at the same time will function to break up hardened snow as well as chunks of ice that may be embedded in the snow and discharge them from the unit. In addition, small stones and pieces of debris which would normally interfere with known snow blowing apparatus will not normally interrupt the operation of the snow blower in accordance with this invention.

Another object of the invention resides in the novel and improved means for removably securing a snow blower to small vehicles such as garden tractors and the like and at the same time to facilitate adjustment of the height of the snow blower from the surface to be cleared.

Still another object of the invention resides in the provision of a novel and improved snow blower which may be readily attached to and driven from a garden tractor.

Still another object of the invention resides in the provision of a novel and improved snow blower characterized by its dependendability, usefulness in all types of snow and ease of operation and maintenance.

The above and other objects and advantages of the invention will become more apparent from the following description and accompanying drawings forming part of this application.

In the drawings:

FIG. 1 is a perspective view of the snow blower in accordance with the invention in position on the front of a garden tractor;

FIG. 2 is a side elevational view in partial section of the structure shown in FIG. 1;

FIG. 3 is a cross-sectional view of FIG. 2 taken along the line 3—3 thereof;

FIG. 4 is a cross-sectional view of FIG. 2 taken along the line 4—4 thereof;

FIG. 5 is a cross-sectional view of FIG. 3 taken along the line 5—5 thereof;

FIG. 6 is a cross-sectional view of FIG. 3 taken along the line 6—6 thereof;

Figure 9:
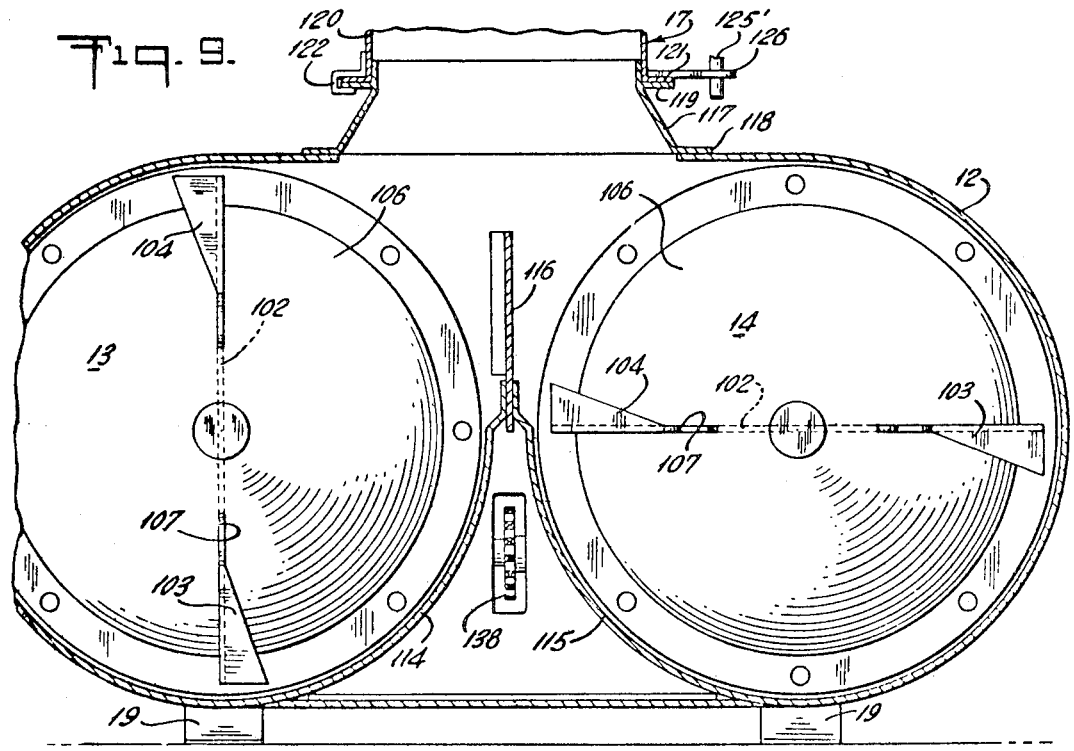
Figure 10:
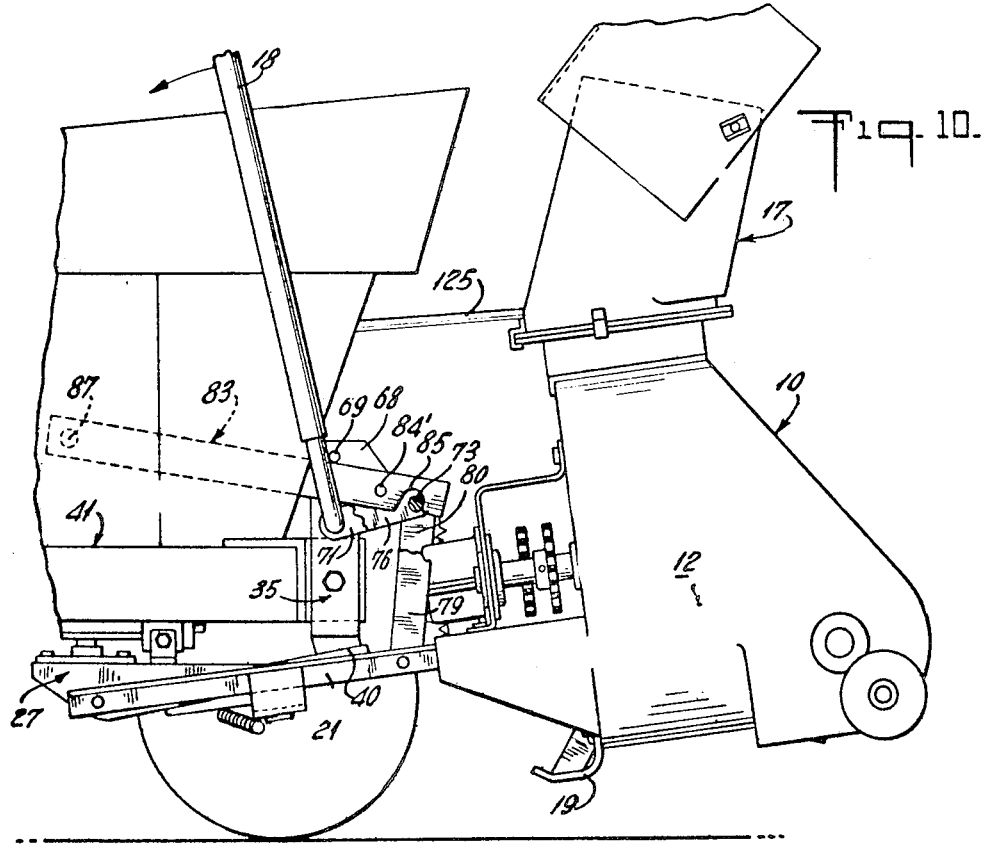

FIGS. 7 and 8 are cross-sectional views of FIG. 6 taken along the lines 7—7 and 8—8 thereof;

FIG. 9 is a cross-sectional view of FIG. 6 taken along the line 9—9 thereof;

FIG. 10 is a fragmentary side elevational view of the structure shown in FIG. 2 with the snow blower in the uppermost position.

FIG. 11 is an exploded perspective view illustrating the mode of attachment of the snow blower to a garden tractor; and FIG. 12 is an exploded perspective view of one of the rotating blowers in accordance with the invention.

Referring now to the drawings and more specifically to FIG. 1, the snow blower is generally denoted by the numeral 10 and is illustrated in full lines while the tractor carrying and powering the snow blower is denoted by the numeral 11 and shown in dotted outline. Broadly the snow blower includes a double housing 12 having counter rotating blowers 13 and 14 and two sets of helical augers generally denoted by the numerals 15 and 16. Each auger consists of two reversely formed helical sections 15', 15" and 16', 16", respectively, which feed the snow inwardly to their respective blowers 13 and 14, and the blowers in turn force the snow upwardly and discharge it through the chute generally detonated by the numeral 17. The blower 10 is releasably secured to the front of the tractor 11 and can be raised by operation of the handle 18 and locked in the raised position by locking means as will be described. Power is delivered to the blower from the engine used to propel the tractor 11, and the height of the blower can be adjusted by skids 19 as illustrated more clearly in FIGS. 2 and 5.

The blower housing is secured to the tractor by a pair of spaced arms 20 and 21 formed of angle iron. The latter are attached to the housing 12 by means of a support structure denoted by the numeral 22 and having a relatively heavy top plate 23 extending transversely of the housing and a pair of side walls 24 integrally formed therewith. The support structure may be secured to the rear wall 25 of the housing 12 by any suitable means such as welding or the utilization of suitable nuts and bolts or the like. The arms 20 and 21 are fastened to the underside of the plate 23 and as will be observed more clearly in FIG. 3 extend beneath the tractor 11 and between the front wheels 26 thereof.

Support for the arms 20 and 21 is provided by a plate support assembly generally denoted by the numeral 27 and having a top wall 28 and downwardly extending side walls 29. The top wall of the plate is provided with a pair of angle brackets 30 welded or otherwise secured thereto. A vertically disposed U-shaped member 31 having a vertically disposed wall 32 and rearwardly extending legs 33 is secured to the angle brackets 30 by means of bolts 34 extending through cooperating openings in the brackets 30 and the legs 33. The forward edge of the plate assembly 27 is provided with a U-shaped bracket 35 having a transverse portion 36 and upwardly extending legs 37. The legs 37 each have a lower opening 38 and an upper opening to accommodate the transverse shaft 39. The central portion of the transverse member 36 of the U-shaped bracket 35 is sloped to conform with a forwardly and upwardly inclined portion 40 of the plate assembly 27 which as will be shown provides clearance for a drive belt when the blower 10 is in the raised position as shown in FIG. 10.

The supporting plate assembly 27 is secured to the forward portion of the tractor 11 as will be observed more clearly in FIGS. 2, 5, and 11. More specifically, the tractor 11 is provided with a horizontal frame 41 and the forward portion of the frame has a downwardly extending plate 42. The center portion of the plate 42 has an opening 43 to receive a bolt 44 which extends through the opening 43 and a cooperating opening 45 in the transverse plate 32 of the U-shaped member 31. In addition, the front edge 46 of the tractor frame 41 includes a U-shaped bracket 47 having downwardly extending legs 48. Each leg 48 has an opening 49 therein to receive a bolt 50. The bolts 50 each extend through one of the openings 38 in the upwardly extending leg 37 of the bracket 35 and through the associated opening 49 in the bracket 47. In this way the plate support assembly 27 is fixedly secured to the tractor 11.

The blower 10 is pivotally secured to the supporting plate assembly 27 by bolts or other suitable pivoting means extending through cooperating openings 51 and 52 in the arms 20, 21 and the walls 52 of the plate support assembly 27, respectively. The plate support assembly 27 further carries a upper drive pulley 53 supported by a shaft 54 which extends downwardly through a bearing 55 and carries a second pulley 56 on the lower side thereof. The pulley 53 is coupled by a V-belt 57 to the motor drive pulley 58 and loosely engages the pulleys so that power will not be transmitted to the pulley 53 until an idler pulley 59 forcibly engages the V-belt. A bottom view of this assembly is illustrated in FIG. 4 which shows the clutching pulley 59 in the disengaged position. The pulley 59 is carried by a lever 60 pivoted at 61. The lefthand end of the lever 60 as viewed in FIG. 4 is connected by a pair of links 62 and 63 pivoted one to the other at 64. The free end of link 63 is secured to the clutch handle 65 which extends upwardly through the tractor base 41 and the tractor housing 41'. By rotating the clutch handle 65, the clutch pulley 59 can be moved toward and away from the belt 57 to control the transmission of power to the pulley 53.

As previously mentioned, the snow blower 10 can be raised and lowered by operation of the handle 18. The handle 18 engages a vertical portion 66 of an L-shaped rod generally denoted by the numeral 67. The horizontal leg of the member 67 is denoted by the numeral 39 and rotatably engages the upper openings in the U-shaped bracket 35. The leg 37 further includes a plate 68 welded to the leg 37 and having an opening aligned with the upper opening in that leg. The plate also includes a pin 69 and a hole 70.

The horizontal leg or shaft 39 of the L-shaped member 67 has a link 71 welded thereto at 72, and the outer end of the link 71 has an opening to accommodate a second shaft 73 parallel to the shaft 39. The shaft 73 has a link 74 welded thereto at 75 and the opposing end of the link 74 has an opening to slidably receive the shaft 39. The opposing end of the shaft 73 has a link 76 similar to the link 74 and welded to the shaft 73 at 77. When the shaft 39 slidably engaged the upper openings in the U-shaped bracket 75 and engages the links 74 and 76, a bolt 78 is inserted through the links 71 and 74 to hold the assembly in position. With the arrangement thus far described, the shaft 73 is moved through a vertical path as the handle 18 is moved forwardly and rearwardly. To effect vertical displacement of the blower 10, the shaft 73 carries a pair of links 79 and 80 which rotatably engage the shaft 73 and have openings 81 at the bottom ends thereof to receive bolts extending through cooperating openings 82 in the arms 20 and 21. With this arrangement as the handle 18 is pulled rearwardly, the blower 10 will be lifted.

In the event it is desired to maintain the blower in a raised position a locking lever 83 is provided. The lever 83 has an opening 84 pivoted to the bracket 68 by a bolt or other suitable means engaging the openings 84 and 70. The righthand end of the lever 83 as viewed in FIG. 11 has an inclined notch 85 so that when the handle 18 is moved to the rear, the shaft 73 will move upwardly into the notch 85. A spring 86 connected between the outer end of the lever 83 and a portion of the tractor frame holds the forward end of the lever 83 in the downward position and this causes the shaft 73 and the blower to be locked in the upper position as shown for instance in FIG. 10. The rear portion of the shaft includes an actuating pedal 87 so that by applying foot pressure to the pedal 87, the forward end of the lever will move upwardly and permit the blower to be lowered to the position shown for instance in FIGS. 1 and 2.

Power for operation of the augers 15 and 16 and the blowers 13 and 14 is transmitted through a gear box 88 which is bolted to the rear wall of the L-shaped housing 89. Housing 89 is secured at its upper side to the rear wall 25 of the blower housing 12 and at the lower edge to the transverse plate 23. The gear box 88 has a vertical shaft 88' carrying a horizontal pulley 90 which is coupled by a V-belt 91 to the lower pulley 56 on the plate support assembly 27. An idler wheel 92 carried on the outer end of the lever 93 and pivoted to the plate support assembly 27 at 94 is held in firm engagement with the belt 91 by a spring 95. The gear box 88 is further provided with a pair of coaxial shafts 96 and 97 carrying sprockets 98 and 99, respectively, disposed within the housing 89. The gear box 88 effects rotation of the sprockets 98 and 99 in opposite directions for operation of the blowers 13 and 14.

Each blower 13 and 14 comprises a circular plate 100 having a plurality of threaded holes 101 about the periphery thereof. A blade 102 is disposed diametrically of the plate 100 and has offset outer edge portions 103 and 104. A pair of flanges 105 integrally formed with the blade 102 are welded or otherwise secured to the plate 100. A conical cover 106 has a pair of opposing slots 107 to accommodate the blade 102 and a plurality of openings 108 for attaching the cover 106 to the plate 100 by means of cap screws or other suitable means. Each plate 100 has a shaft 109 secured thereto and extending rearwardly through bearings 110 and 111 carried by the rear wall 25 of the blower housing and the wall 89' of the housing 89. Shafts 109 carry sprockets 112 which are coupled to the sprockets 98 and 99 by a pair of chains 113 as will be observed more clearly in FIG. 8. With this arrangement it will be observed that the righthand blower as viewed in FIG. 9 will rotate in a clockwise direction while the lefthand blower will rotate in a counterclockwise direction. Furthermore, the housing 12 of the blower 10 is arranged to conform at its outer edges with the blowers 13 and 14 to form a very narrow gap therebetween. The central portion of the housing has a pair of curved plates 114 and 115 which extend from the bottom of the housing upwardly in closely spaced relationship to the blowers and terminate about midway of the height of the housing 12. A plate 116 extends upwardly from the arcuate sections 114 and 115 to direct the snow upwardly through the chute generally denoted by the numeral 17. The chute 17 has a lower annular portion 117 welded at 118 to the top of the housing 12. The upper edge of the annular portion 117 has an outwardly extending flange 119 for rotatably supporting the chute section 120 which has a flange 121 on the bottom edge thereof. The chute section 120 is rotatably secured to the flange 119 by a plurality of brackets 122 carried by the chute section 120. An upper chute section 123 is pivotally secured 124 to the chute section 120 so that it may be readily tilted to direct the angle of the snow being discharged from the blower.

The horizontal angle of the chute 17 can be controlled by a control rod 125 having its forward end attached to a bracket 126 which is welded to the flange 121 of the lower chute section 120. More specifically, the forward end of the rod 125 has a downwardly formed leg 125' which extends through a cooperating opening in the bracket 126. The rear portion of the control rod 125 is supported by a bracket 127 secured at its upper end to the tractor frame and extending through a grommet 128 at the lower end of the bracket 127. With this arrangement the tractor driver by merely moving the rod longitudinally can rotate the chute through an angle of approaching 180 degrees. The blower housing further includes a front plate 129 disposed between the blowers 13 and 14 to prevent the snow from being discharged forwardly and thereby cause it to be forced upwardly and out of the chute 17.

The augers 15 and 16 each comprise two sets of augers 15′, 15″ and 16′, 16″. Each of the auger sections 15′, 15″ and 16′, 16″ is formed of two helical elements 130 and 131 which are secured to sleeves 132 by diametrically disposed brackets 133 having openings to receive the sleeves 132. The four sleeves 132 are carried by and secured to shaft 134 supported by bearings 135 on each end of the forwardly sloping portions of the blower housing 12. The center of the shaft 134 carries a sprocket 136 coupled by a chain 137 to a sprocket 138 carried by the shaft 139. The shaft 139 is supported by bearings 140 carried by brackets 141 depending from the underside of the plate 23. Power is applied to the shaft 139 by a sprocket 142 extending from the gear box 88 as may be viewed more clearly in FIG. 2. A chain 143 drives a sprocket 144 which is secured to the shaft 139. In this way power is applied to rotate the augers simultaneously with the rotation of the blowers 13 and 14. The front edge 145 of the blower housing 12 carries a blade 146 extending beneath the augers 15 and 16 to direct the snow from the surface being cleared into the augers 15 and 16 whereupon it is delivered to the blowers which in turn force the snow upwardly and outwardly through the chute 17.

What is claimed is:

1. A snow blower adapted to be removably attached to and driven from the source of motive power of a vehicle comprising a plate support assembly removably secured to the underside of said vehicle, said plate support assembly including a shaft rotatably mounted thereon and means removably coupling said shaft to said source of motive power, a snow blower including a housing having an open front, means pivotally coupling said housing to said plate support assembly for movement in a vertical plane, a pair of coplanar blowers within said housing, snow discharge outlet means extending upwardly from and opening into said housing at a point midway between said blowers, snow gathering augers carried by said housing and disposed forwardly of said blowers to feed snow into said blowers, a gear box carried by said housing and having a power input shaft and at least two output shafts, means removably coupling said input shaft to the first said shaft and means coupling said output shafts to said blowers and augers whereby said blowers and augers are driven by said source of motive power, said plate support assembly including linking means attached to said pivotal coupling means to raise and lower said snow blower relative to said vehicle, said pivotal coupling means comprising a pair of spaced members each secured at one end to the blower housing and at the other end to the rear portion of said plate supporting assembly, and said linking means including a transverse shaft, means rotatably supporting said shaft forwardly of and spaced above said plate support assembly, forwardly extending links secured to said shaft and means linking each of said forwardly extending links to one of said spaced members whereby rotation of said shaft will raise and lower said blower housing.

References Cited

UNITED STATES PATENTS

| | | | |
|---|---|---|---|
| 1,977,871 | 10/1934 | Christopherson | 37—43 R |
| 2,381,017 | 8/1945 | Wandscheer | 37—43 C |
| 2,763,072 | 9/1956 | Inhofer | 37—43 B |
| 3,208,167 | 9/1965 | Vincent | 37—43 R |
| 3,484,962 | 12/1969 | Klapprodt | 37—43 B |
| 1,567,627 | 12/1925 | Stanton | 37—43 R |
| 2,292,115 | 8/1942 | Frisbie | 416—245 X |
| 2,603,007 | 7/1952 | Fiacco | 37—43 B |
| 2,765,858 | 10/1956 | Hardy | 416—245 |
| 2,794,271 | 6/1957 | Wallack | 37—43 R |

FOREIGN PATENTS

| | | | |
|---|---|---|---|
| 862,031 | 2/1941 | France | 416—245 |

J. REED FISHER, Primary Examiner